(12) United States Patent
Nill

(10) Patent No.: US 6,574,048 B2
(45) Date of Patent: Jun. 3, 2003

(54) METHOD AND APPARATUS FOR ATTENUATING SOLAR FLUX IN A HEAD-UP DISPLAY

(75) Inventor: Walter Joseph Nill, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 8 days.

(21) Appl. No.: 09/795,678

(22) Filed: Feb. 28, 2001

(65) Prior Publication Data

US 2002/0118462 A1 Aug. 29, 2002

(51) Int. Cl.[7] .................. G02B 27/14; G09G 5/00
(52) U.S. Cl. .................. 359/632; 359/630; 345/7
(58) Field of Search .................. 359/630, 631, 359/632, 633, 638; 345/7

(56) References Cited

U.S. PATENT DOCUMENTS

| | | | | |
|---|---|---|---|---|
| 4,289,381 A | * | 9/1981 | Garvin et al. | 359/485 |
| 4,348,453 A | | 9/1982 | Cohen | 428/333 |
| 4,763,990 A | * | 8/1988 | Wood | 359/630 |
| 5,034,732 A | | 7/1991 | Iino | |
| 5,066,102 A | * | 11/1991 | Hirano | 359/630 |
| 5,176,972 A | | 1/1993 | Bloom et al. | 430/14 |
| 5,414,439 A | | 5/1995 | Groves et al. | |
| 5,486,840 A | * | 1/1996 | Borrego et al. | 359/630 |
| 5,709,463 A | | 1/1998 | Igram | |
| 6,359,737 B1 | * | 3/2002 | Stringfellow | 359/631 |

OTHER PUBLICATIONS

"Handbook of Thin Film Technology," edited by Leon I. Maissel and Reinhard Glang, International Business Machines Corporation; included are: Preface, p. 1–71, list of Contributors, p. 4–1 (Chapter 4 index), and p. 5–1 (Chapter 5 index), 7 pages in total, copyrighted 1970 by McGraw-Hill, Inc.

* cited by examiner

Primary Examiner—Georgia Epps
Assistant Examiner—Alicia M. Harrington
(74) Attorney, Agent, or Firm—Stefan V. Chmielewski

(57) ABSTRACT

A head-up display (HUD) uses reduced reflectivity projection optics to reduce the harmful effects of intense solar radiation on HUD components. In a HUD generally having a display, a mirror, and a combiner, an image is projected from the display to the combiner via the mirror. The reflectance of the mirror is reduced to prevent high thermal stress on HUD components. The light source is brighter than a conventional backlight, and thus compensates for the reduction in the reflectance of the mirror. Reduced mirror reflectance translates into a reduced thermal load on the display, lens, case, electronics, or wherever the solar radiation is directed.

31 Claims, 2 Drawing Sheets

METHOD AND APPARATUS FOR ATTENUATING SOLAR FLUX IN A HEAD-UP DISPLAY

TECHNICAL FIELD

The present invention generally relates to head-up display (HUD) systems and, more particularly, to a method and apparatus for attenuating solar radiation entering a HUD.

BACKGROUND OF THE INVENTION

Head-up displays (HUD) are known and have been used in military and commercial aircraft for several years. HUDs have also found application in automobiles. In the automobile application, a HUD unit typically projects an image onto the windshield in front of the driver along the driver's forward line of sight. The HUD's projection optics are conventionally mounted in the instrument panel below the windshield. An advantage of HUDs is that a driver can view the display without taking his or her eyes off of the road. In some embodiments, the HUD projection results in a virtual image that appears to be positioned at a distance in front of the vehicle. This is useful, for example, in a night vision HUD that projects a simulated view of the road and obstacles ahead of the vehicle. This provides an early warning to the driver. Adapting HUD units for use in automobiles requires making the units rugged, reliable, cost-effective, and functional in a wide range of environmental conditions.

A problem with HUDs in automobiles is high thermal loads due to solar radiation. During bright sunny days, solar radiation enters the HUD system causing thermal stress to the internal components. Some of the components which are sensitive to this thermal stress include the display, the electronics, the lens, and the HUD case. The problem is intensified due to the size, reflectivity, and magnifying characteristics of the HUD projection optics (e.g., the aspheric mirror). The HUD optics can magnify the solar radiation by a factor of ten or more. The problem experienced with high solar thermal radiation in an automobile HUD is illustrated in FIG. 1.

In a typical HUD configuration, solar radiation 12 (i.e., sunlight) enters through the windshield 13 of vehicle 10. Radiation 12 enters the HUD 11 via lens 14 where it is reflected and magnified by mirror 15. Mirror 15 is one element of the projection optics of the HUD. In the worst case scenario, radiation 12 is focused on a thermally sensitive component such as display unit 16. The HUD projection optics (e.g., mirror 15) can magnify radiation resulting in temperatures exceeding 140 degrees Celsius. This thermal stress can damage HUD components.

The prior art has attempted to solve this problem in numerous ways. One technique uses a filtering lens 14 to reduce the thermal effects of solar radiation 12. The filtering lens 14 reduces the thermal radiation entering the HUD and thereby reduces the thermal stress. However, this conventional technique is generally not sufficient to solve the problem alone and is therefore typically used in combination with some of the following techniques.

Another conventional technique for reducing the adverse affects of high solar thermal radiation is to use heat shields. Heat shields are typically made of metal and shield sensitive components from the radiation 12. The shields generally work reasonably well, but are expensive and cannot be used to shield the display unit 16 at all times.

A third technique to handling this radiation problem is very expensive and involves the use of a shutter mechanism to shield the display unit 16 from the radiation 12. The shutter mechanism comprises moving parts that are moved into a position to shield display unit 16 as needed. The shutter mechanism also requires actuators and electronics to control the shielding operation. This solution is obviously costly and may have lower reliability.

A fourth technique to avoiding adverse affects of thermal radiation uses heat tolerant components and materials. However, conventional heat tolerant items are generally more expensive. For example, the HUD case or lens 14 can be made of less expensive plastics if they are not required to tolerate high thermal stress.

Accordingly, it is desirable to provide for a HUD that has improved operation in high intensity solar radiation conditions. It is also desirable to provide a HUD system design that does not require costly shields, shutters, lenses, and thermal tolerant components, particularly for use in an automobile.

SUMMARY OF THE INVENTION

The present invention provides for a head-up display (HUD) that couples reduced reflectivity projection optics and a high brightness light source to produce a high quality image and reduce the thermal effects of solar radiation on HUD components.

The HUD generally includes a display, a light source, a mirror, and a combiner. The light source illuminates the rear of the display, which projects an image to the combiner via the mirror. The invention reduces the thermal load on HUD components by reducing the reflectance of the mirror. The light source of the invention is preferably brighter than a conventional backlight and thus compensates for a portion of the reduced reflectance of the mirror.

The invention calls for a mirror that has reduced reflectance. The preferred embodiment uses a mirror having reflectance of approximately 30%. In contrast, this is about ⅓ the reflectivity of the mirrors in the prior art. Historically, the prior art taught the opposite of the invention by attempting to maximise mirror reflectivity and specified a high reflectivity of typically 88% to 90%. This is largely because of the light loss in other elements of the conventional HUD system. For example, one factor contributing to light loss is the windshield (i.e., combiner) in the automobile. Government regulations generally prevent windshields from being coated or tinted to reflect the projected image of a HUD. Consequently, a typical untinted windshield reflects approximately only 15% of the projected image brightness from a HUD. Another factor contributing to light loss is the display. Liquid crystal displays (LCDs) typically used in HUDs transmit only approximately 8% of the light from a backlight light source. Given these light loss factors and others, it was generally presumed in the prior art that the mirror reflectance should be as high as possible to prevent any further loss of light. The invention runs counter to these teachings and reduces the reflectance of the mirror.

The preferred embodiment of the present invention uses a single aspheric mirror in the projection optics, however, those skilled in the art understand that multiple mirrors, whether aspheric or not, may also be used. The invention is equally applicable to HUDs having projection optics with multiple mirrors. In this specification, the term reflector system is defined to include a single mirror or multiple mirror systems for reflecting the image generated by the HUD.

A new high brightness light source backlights the display. The light source is approximately three times as bright as similar light sources in the prior art. The high brightness light source compensates for a portion of the reduced reflectance of the reflector system such that the resulting projected image retains approximately the same illumination level. The higher cost of the new light source is more than compensated for by the cost savings in the other components of the HUD.

The present invention may use a conventional display. The display forms symbology on its screen responsive to the video signal from the video processor. Because the light source is brighter, the resulting projection image from the display is also proportionally brighter. The image is directed to the reflector system that reflects the image to the windshield.

According to one aspect of the present invention, the windshield functions as the combiner in a typical automotive HUD application. The HUD generated image is projected onto the windshield where it is in the forward line of sight of the driver. It is common for automotive applications to use the windshield as the combiner. However, it is understood that the invention is equally applicable to HUD systems that use a conventional combiner element. For purposes of this specification a combiner refers to any element that serves as a display screen for the HUD image and includes a conventional combiner, windshield, or similar element.

Referring to FIG. 1, the operation of the invention can be understood. Solar radiation 12 passes through windshield 13 and lens 14 and enters HUD 11. Because of the reduced reflectance mirror of the invention, lens 14 may be less expensive since it need not filter the solar radiation 12 nor withstand high thermal stress. The radiation 12 is reflected and magnified by mirror 15. Because of the invention, however, mirror 15 reflects only approximately 30% of the solar radiation 12. The intensity of the reflected solar radiation is reduced sufficiently so that costly heat shields and other elements may be reduced or eliminated.

The design of the present invention advantageously solves the problems of the prior art to provide an improved solar radiation tolerant HUD. Reducing the reflectance of the reflector system results in reduced thermal loading of the HUD components. The reduced thermal loading allows elimination of components such as mechanical shutters, thermal shields, and filtering lenses. The invention may also result in reduced assembly costs, reduced parts costs, and increased reliability.

Yet another discovered advantage of the invention is a reduction in green or colored reflections onto the windshield 13. Prior to the invention, reflection was caused by the typically green tint applied to lens 14. Light reflected by lens 14 caused a green reflection on the windshield. These reflections are generally considered annoying and unsightly. Because the invention eliminates the requirement for a tinted lens 14, this problem may also be eliminated.

It is envisioned that the invention may be adapted to various embodiments of HUD systems. This includes HUDs with multiple mirror projection optics, various light sources, various combiners, and various optical path configurations.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Head-up display (HUD) systems are well-known to those skilled in the art. Therefore, HUD operation will not be discussed in detail in this specification. However, U.S. Pat. No. 5,414,439, entitled "Head Up Display With Night Vision Enhancement," issued to Groves et al. on May 9, 1995, describes a HUD for use in an automobile and is incorporated herein by reference.

Figure 1:
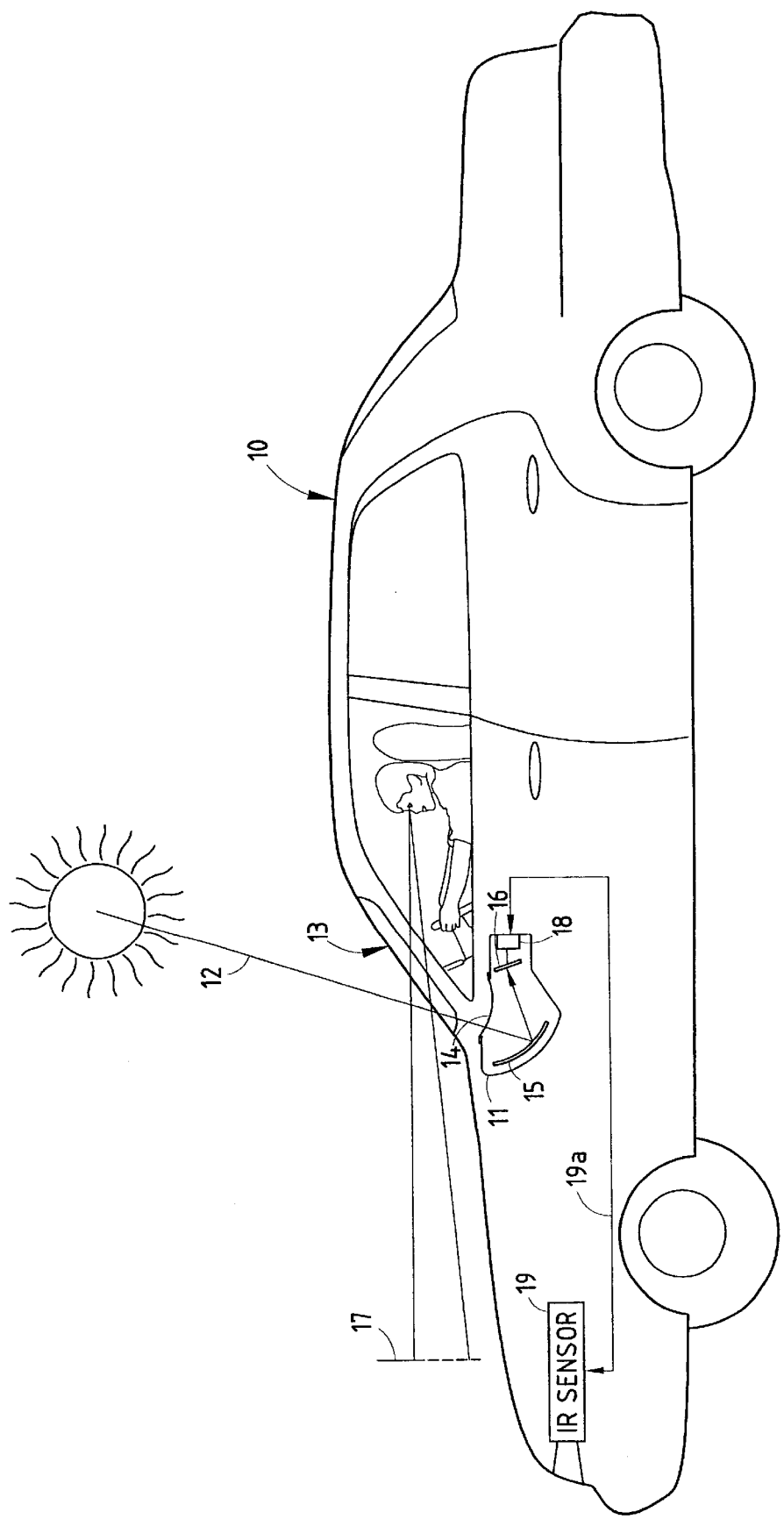
FIG. 1 is a side view of a night vision HUD in an automobile.

Referring again to FIG. 1, automobile 10 is shown equipped with the night vision HUD 11 employing the present invention. HUD 11 communicates information to the vehicle operator via an image projected in front of the operator and preferably along the operator's forward visual line of sight. The image is projected onto windshield 13 and results in a virtual image 17 being perceived by the operator. HUD 11 allows the operator to view the virtual image 17 without taking his or her eyes off of the road.

HUD 11 includes a video processor 18, display unit 16, mirror 15, and windshield 13 (which, in this embodiment, operates as a combiner). Video processor 18 is of conventional design and therefore will not be described here in detail. The preferred embodiment uses a digital microprocessor, memory, and related circuitry to implement processor 18. Processor 18 is also referred to in the art as a symbol generator. In this specification these terms are treated as equivalent since they both perform essentially the same function as far as the instant invention is concerned.

Video processor 18 may receive data from multiple systems and sensors in automobile 10. For example, in a night vision embodiment, video data is received from an infrared sensor 19. Infrared sensor 19 detects objects in the roadway ahead of the vehicle 10 and generates an IR signal 19a representative thereof. In alternate embodiments, video processor 18 receives and formats data from various sensors including, vehicle speed sensors, engine sensors, light sensors, GPS position sensors, and the like. Video processor 18 then formats the received data into a suitable display signal 18a (see FIG. 2) that is communicated to display unit 16.

Display unit 16 preferably includes both an electronic display (e.g., an AMLCD) and a backlight (i.e., light source) which are described below. Display unit 16 is of conventional design except for the backlight that has increased brightness to compensate for a portion of the reduced reflectance of the mirror 15 of the instant invention. Responsive to display signal 18a, the display unit 16 forms symbology on its screen. If needed, the illumination of display unit 16 is provided by the backlight and an image of the symbology is projected onto windshield 13 via mirror 15. Of course, those skilled in the art understand that a backlight is not needed if a light emissive display, such as a VFD, AMVFD, or the like, is used.

Mirror 15 is a significant element of the invention. In the preferred embodiment, the mirror 15 (which is the reflector system) consists of a single large aspheric mirror 15. As discussed above, solar radiation 12 strikes mirror 15 and is reflected to various HUD components. Solar radiation 12, which may be magnified by the mirror 15, posed a significant threat to HUD components in conventional HUD systems. In the preferred embodiment of this invention, the reflectance of mirror 15 is reduced from approximately 90% to approximately 30%, is about ⅓ the reflectance of prior art mirrors. It has been discovered that such a reduction in reflectance of mirror 15 reduces the thermal load from solar radiation such that heat-shielding devices are no longer required. Movable shutters, metal shields, and tinted lenses may therefore be eliminated. Additionally, the HUD case (i.e., housing) and other components may be constructed of less heat tolerant (and less expensive) materials.

The reflectivity of mirrors can generally range from about 10% and up to about 90% reflectivity. While the preferred embodiment uses a mirror having about 30% reflectivity, it is understood that a range of reflectivity may be used to practice the invention depending on particular design requirements. The invention is useful whenever the mirror reflectivity is reduced even slightly such as to about 80% reflectivity. It is preferable to have mirror reflectivity below 70% and it is even more preferable to have mirror reflectivity below 60% or even 50%. The most preferable mirror reflectivity is below 40% and, more specifically, approximately 30% reflectivity. The precise reflectivity is 32% plus or minus 4%. This results in reflectively ranging between 28% to 36%. Also, the invention may be used in combination with the techniques of the prior art. For example, a higher reflectance for the mirror 15 may be combined with a filtered lens and thermally tolerant components to yield a satisfactory apparatus.

Windshield 13 is of conventional design and functions as the combiner for the HUD 11. The HUD image is projected onto windshield 13 along the operator's forward line of sight. It should be appreciated that the invention is applicable for use with either a windshield or a conventional combiner.

Figure 2:
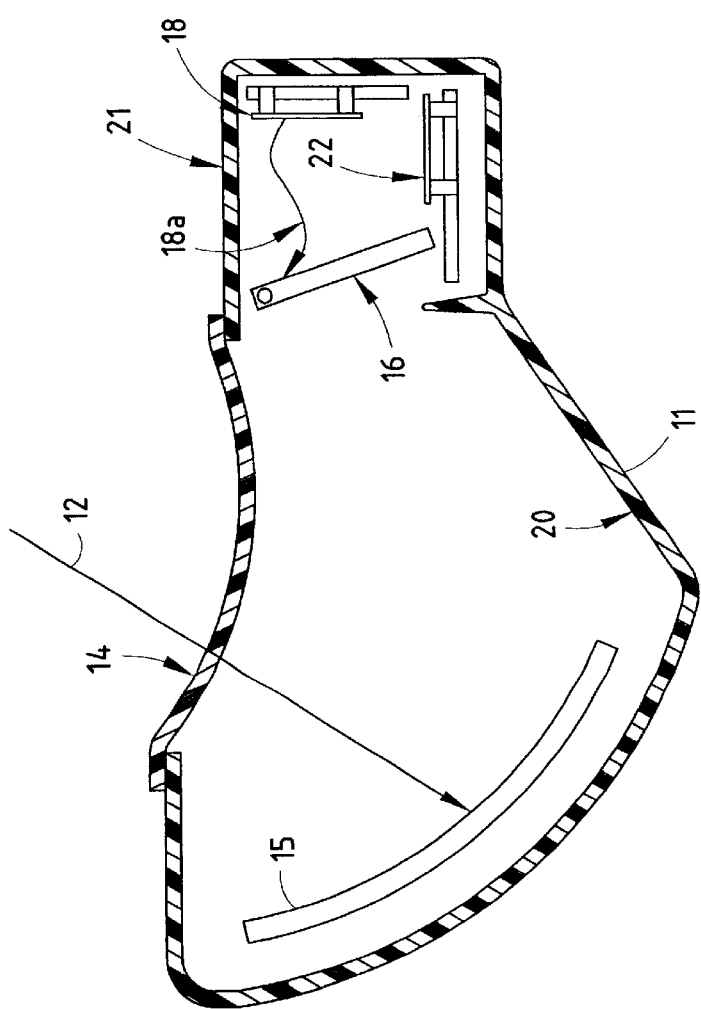
FIG. 2 is a cutaway side view of a HUD.

Referring now to FIG. 2, a cutaway side view of HUD components is shown to illustrate in more detail the configuration of an automotive HUD system. Some of the major components are mirror 15, display unit 16, lens 14, and case 20. It is readily apparent that solar radiation 12 may be reflected by mirror 15 to several HUD components. For example, radiation 12 can be reflected to cover 21, display unit 16, case 20, or back to lens 14, depending on the relative position of the sun (radiation source) and the HUD.

There is also an advantage to electronics, such as inverter PCB 22 or video processor 18, which benefit from the reduced thermal effects of the invention. Inverter PCB 22 drives the fluorescent light source that is part of display unit 16. The invention may prevent thermal damage to electronic components and prolong the life of electronic components.

Figure 3:
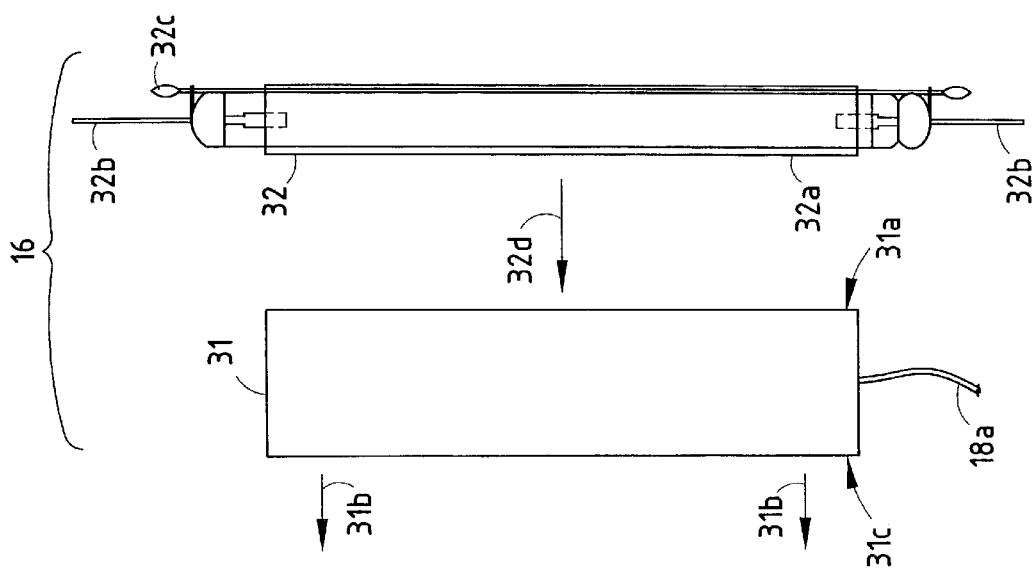
FIG. 3 is a side view of a display and light source.

Referring to FIG. 3, there is shown a display unit 16 comprising an electronic display 31 and a light source 32. The preferred embodiment uses an active matrix LCD (AMLCD) for electronic display 31. An AMLCD has a high frame rate that is preferred for video applications such as in a night vision system. Display 31 generates symbology on the display screen 31c. Other types of electronic displays can also be used with the invention. Other such displays include vacuum fluorescent displays (VFDs), active matrix VFDs (AMVFDs), passive liquid crystal displays, and the like. Those skilled in the art understand that if light emissive displays, such as VFDs, are used, then a back light is not needed. However, light displays, which are not emissive, do need a backlight such as light source 32.

Light source 32 is preferably a high brightness fluorescent lamp such as the cold cathode fluorescent lamp, type MBSM26E (xxx) X62NLU with heater, manufactured by Harison Toshiba Lighting Corp. of Imabari, Japan. The aforementioned fluorescent lamp is small, has long life, and, importantly, high brightness. Light source 32 includes tube 32a, leads 32b, and heater 32c. The invention can be used with other light sources as well, including halogen lamps.

Light 32d from light source 32 illuminates the rear 31a of electronic display 31. Electronic display 31 projects an image 31b that is reflected by the reflector system 15 to windshield 13.

A method of the invention follows from the apparatus description above. In a HUD having a reflector system, a display, and a light source, the method reduces the thermal loading on HUD components. The HUD is positioned such that solar radiation enters the HUD and strikes the reflector system. The reflectance of the reflector system is reduced such that less solar radiation is reflected than by a conventional reflector system. The reflectance of the reflector system may range from about 10% to about 80% depending on the specific design or application. In the preferred embodiment, the reflector system reflects about 30% of the solar radiation striking the reflector. This is a reasonable compromise between reducing thermal stress and maintaining image brightness.

The light source is a high brightness light source. The increased brightness of the light source compensates for at least a portion of the reduced reflectance of the reflector system.

The HUD 11 of the present invention achieves significant reductions in thermal loading while maintaining excellent image illumination. The invention is useful in many HUD systems, and is especially useful in HUD systems employed in automobiles. The invention reduces the need for costly heat shields and shutters, reduces assembly costs, and also should improve reliability.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A head-up display (HUD) comprising:
    a combiner;
    an electronic display;
    a reflector system having reflectance of less than approximately 80%; and
    a high brightness light source illuminating the rear of the electronic display wherein the light source is sufficiently bright to cause a visible image to be projected from the display and onto the combiner via the reflector system.

2. The HUD according to claim 1, wherein the reflector system has sufficiently low reflectance such that solar radiation reflected by the reflector system does not damage the display.

3. The HUD according to claim 2, wherein the reflector system has sufficiently low reflectance such that solar radiation reflected by the reflective system does not damage HUD components.

4. The HUD according to claim 1, wherein the reflector system has reflectivity of less than 70%.

5. The HUD according to claim 4, wherein the reflector system has reflectivity of less than 60%.

6. The HUD according to claim 5, wherein the reflector system has reflectively of less than 50%.

7. The HUD according to claim 6, wherein the reflector system has reflectivity of less than 40%.

8. The HUD according to claim 7, wherein the reflector system reflectivity is about 30%.

9. The HUD according to claim 8, wherein the reflector system reflectivity is between 28% and 36%.

10. The HUD according to claim 1, wherein the reflector system includes an aspheric mirror.

11. The HUD according claim 1, wherein the high brightness light source is a fluorescent lamp.

12. A night vision head-up display HUD system for an automobile comprising:

a combiner;

an electronic display;

an aspheric mirror having reflectance of less than 70%; and, wherein an image is projected from said electronic display and said image is sufficiently bright to be projected from the display and onto the combiner via the mirror.

13. The night vision HUD system according to claim 12, wherein the aspheric mirror has reflectance of less than 60%.

14. The night vision HUD system according to claim 13, wherein the aspheric mirror has reflectance of less than 50%.

15. The night vision HUD system according to claim 14, wherein the aspheric mirror has reflectance of less than 40%.

16. The night vision HUD system according to claim 15, wherein the aspheric mirror has reflectance of about 32%.

17. The night vision HUD system according to claim 12, wherein the aspheric mirror has reflectance suitably low to prevent thermal damage to components of the HUD when solar radiation is reflected from the mirror.

18. The night vision HUD system according to claim 12, wherein the display is an AMLCD.

19. The night vision HUD system according to claim 18, further comprising a light source illuminating the rear of the display.

20. The night vision HUD system according to claim 19, wherein the high brightness light source is a fluorescent lamp.

21. A method of reducing thermal loading in a head-up display (HUD) having a combiner, a reflector system, a display, and an image projected from the display, the method comprising the steps of:

positioning the HUD such that solar radiation strikes the reflector system of the HUD; and, reflecting less than 80% of the solar radiation striking the reflector system.

22. The method of reducing thermal loading according to claim 21, wherein the reflector system comprises an aspheric mirror.

23. The method of reducing thermal loading according to claim 21, wherein the HUD is in an automobile.

24. The method of reducing thermal loading according to claim 21, further comprising the step of providing a high brightness light source whereby the increased brightness compensates for a portion of the reduced reflectance of the reflecting system.

25. The method of reducing thermal loading according to claim 21, wherein the step of reflecting less than 80% is accomplished by reducing the reflectance of the mirrors of the reflector system.

26. The method of reducing thermal loading according to claim 21, wherein the step of reflecting includes reflecting less than 60% of the solar radiation.

27. The method of reducing thermal loading according to claim 26, wherein the step of reflecting includes reflecting less than 50% of the solar radiation.

28. The method of reducing thermal loading according to claim 27, wherein the step of reflecting includes reflecting less than approximately 36% of the solar radiation.

29. The method of reducing thermal loading according to claim 28, wherein the step of reflecting includes reflecting less than 36% of the solar radiation.

30. The method of reducing thermal loading according to claim 29, wherein the step of reflecting includes reflecting between 28% and 36% of the solar radiation.

31. The method of reducing thermal loading according to claim 21, wherein the step of reflecting includes reflecting less than 40% of the of solar radiation entering the HUD to a single component of the HUD.

* * * * *